US007411769B2

(12) United States Patent
Schimanski et al.

(10) Patent No.: US 7,411,769 B2
(45) Date of Patent: Aug. 12, 2008

(54) OVERVOLTAGE PROTECTION DEVICE

(75) Inventors: Joachim Schimanski, Detmold (DE); Martin Wetter, Detmold (DE); Rainer Durth, Horn-Bad Meinberg (DE); Joachim Wosgien, Loehne (DE); Christian Birkholz, Lippetal (DE); Michael Tegt, Blomberg (DE); Karsten Trachte, Barntrup (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 72 days.

(21) Appl. No.: 11/106,593

(22) Filed: Apr. 15, 2005

(65) Prior Publication Data

US 2005/0231872 A1 Oct. 20, 2005

(30) Foreign Application Priority Data

Apr. 16, 2004 (DE) .................. 20 2004 006 227 U

(51) Int. Cl.
*H02H 9/04* (2006.01)
*H02H 75/00* (2006.01)

(52) U.S. Cl. ......................................... 361/91.1; 335/6

(58) Field of Classification Search ................ 361/91.1; 335/6
See application file for complete search history.

(56) References Cited

FOREIGN PATENT DOCUMENTS

| | | | | |
|---|---|---|---|---|
| DE | 38 05 889 | A1 | | 5/1989 |
| DE | 40 00 717 | A1 | | 7/1991 |
| DE | 4000717 | | * | 7/1991 |
| DE | 43 34 101 | A1 | | 4/1994 |
| DE | 42 41 311 | C2 | | 6/1994 |

* cited by examiner

*Primary Examiner*—Michael J Sherry
*Assistant Examiner*—Lucy Thomas
(74) *Attorney, Agent, or Firm*—David S. Safran

(57) ABSTRACT

An overvoltage protection device for protection of low voltage electrical installations, has a device base part with terminals for phase conductors and ground or neutral conductors and at least one overvoltage protection element, with at least one arrester which is located in a housing. The base part of the device has at least one telecommunications contact which has a switch for remote indication of the state of at least one overvoltage protection element, the base part of the device having plug contacts which are connected to the terminals, and the overvoltage protection element having corresponding connector contacts so that the overvoltage protection element can be plugged onto the base part of the device. The overvoltage protection device is improved by the overvoltage protection element having an optical status display and the optical status display and the switch of the telecommunications contact being actuated via a common mechanical actuating system.

16 Claims, 7 Drawing Sheets

OVERVOLTAGE PROTECTION DEVICE

BACKGROUND OF THE INVENTION

1. Field of Invention

The invention relates to an overvoltage protection device for protection of low voltage electrical installations, having a device base part with terminals for phase conductors (L1, L2, L3) and ground or neutral conductors (PE, N) and of at least one overvoltage protection element, with an arrester which is located in a housing, especially a lightning and/or surge arrester, the base part of the device having at least one telecommunications contact which has a switch for remote indication of the state of at least one overvoltage protection element, and preferably, the base part of the device having plug-in contacts which are connected to the terminals and which are made especially as sockets, and the overvoltage protection element having corresponding connector contacts made especially as plug pins so that the overvoltage protection element can be plugged onto the base part of the device.

2. Description of Related Art

Electrical, but especially electronic measurement, control and switching circuits, mainly also telecommunications equipment and systems, are sensitive to transient overvoltages, as can occur especially by atmospheric discharges, but also by switching operations or short circuits in power supply grids. This sensitivity has increased to the extent electronic components, especially transistors and thyristors, are being used; in particular, increasingly used integrated circuits are highly endangered by transient overvoltages.

Electrical circuits normally work without problems using the voltage specified for them, the rated voltage (generally the grid voltage). This does not apply when overvoltages occur. Overvoltages are considered to be all voltages which are above the upper tolerance limit of the rated voltage. They also include mainly transient overvoltages which can occur due to atmospheric discharges, but also due to switching operations or short circuits in power supply grids, and can be galvanically, inductively or capacitively coupled into electronic circuits. In order to protect electrical or electronic circuits, especially electronic measurement, control and switching circuits, mainly also telecommunications equipment and systems, wherever they are used, against transient overvoltages, overvoltage protection elements have been developed and have been known for more than 20 years.

The required measures for protection of the power supply of installations and devices are divided into different stages, depending on the choice of arrester and the expected ambient influences. The overvoltage protection devices for the individual stages are distinguished essentially by the level of arresting capacity and the level of protection.

The first protection stage (type 1) is generally formed by a lightning arrester which is installed as an extremely high power protection device in the central power supply of a building. An important component of such a lightning arrester is a spark gap with at least two electrodes, an arc being forming between the two electrodes when the spark gap is ignited.

The second protection stage (type 2) generally forms a varistor-based surge arrester. This protection stage again limits the remaining residual voltage over the lightning arrester. Depending on the hazard potential of the installation which is to be protected or the building which is to be protected, it can be sufficient in the individual case if the second protection stage, i.e., the surge arrester, is used to start.

In addition, there are triggered-type lightning arresters which are based on the AEC principle (active energy control) and which constitute a combination of a lightning arrester and surge arrester. In this arrester combination, lightning and surge arresters can be connected directly in parallel. This is especially advantageous when the lightning and surge arresters cannot be installed spacially separate from one another.

Within the framework of this invention, the above described versions can be called arresters without the intention to limit the invention to one special arrester type. Such an arrester then forms the significant component of an overvoltage protection element, the overvoltage protection element having at least one housing which holds the arrester.

Known overvoltage protection devices for connection to electrical lines have a device base part which can be mounted, for example, on a supporting rail. For installation of such an overvoltage protection device which is designed to protect, for example, the phase-carrying conductors L1, L2, L3 and the neutral conductor N, and optionally also the ground conductor PE, in the known overvoltage protection devices, on the base part of the device, there are corresponding terminals for the phase conductors and the ground and neutral conductor. In the overvoltage protection device underlying the invention (Phoenix Contact brochure "Overvoltage protection TRABTECH 2002, pages 24 & 25), the base part of the device has an asymmetrical connection pattern. In the known overvoltage protection device in which the base part of the device is made roughly U-shaped, on one leg there are the terminals for the phase conductors and the neutral conductor and on the other terminal leg there is the terminal for the ground conductor.

For simple mechanical and electrical contact-making of the base part of the device with the respective overvoltage protection element, in the known overvoltage protection device, the overvoltage protection elements are made as "protective plugs", i.e., the base part of the device has sockets connected to the terminals and the overvoltage protection element has the corresponding plug pins, so that the overvoltage protection element can be plugged onto the base part of the device. In addition, the known overvoltage protection device has another changeover contact as a sensing element for remote indication of the state of at least one overvoltage protection element, for this purpose, in the base part of the device, there being a switch, and on the overvoltage protection element, there being an actuating element.

In the known overvoltage protection device, installation and mounting are very simple and time-saving due to the plug-in capacity of the overvoltage protection elements. The telecommunications contact enables easy remote monitoring. However, moreover, it can also be desirable to be able to read the state or status of the overvoltage protection element directly on site. But it is a problem here that, especially in overvoltage protection elements which are made as "protective plugs," only relatively little space is available in the housing.

SUMMARY OF THE INVENTION

Therefore, a primary object of this invention is to further improve the initially described overvoltage protection device with respect to the ease of its operation.

This object is, first of all, achieved essentially in the initially described overvoltage protection device in that the overvoltage protection element has an optical status display and that the optical status display and the switch of the telecommunications contact can be actuated via a common mechanical actuating system.

Because the overvoltage protection element or the individual overvoltage protection elements each has or have an optical status display, the state or the status of each overvoltage protection device is displayed directly on site. The simplifies both the installation of the individual overvoltage protection devices and also the maintenance and replacement of defective overvoltage protection devices since their state is directly displayed on the overvoltage protection device both via remote indication in a control center and also via the optical status display. Thus, there is no longer any danger that an installer will replace the wrong overvoltage protection element. Because the optical status display and the switch of the telecommunications contact can be actuated via a common mechanical actuating system, on the one hand, the amount of space required for the optical status display is minimized, and on the other, electrical power is not needed for setting the optical status display.

According to one preferred embodiment of the overvoltage protection device in accordance with the invention, the mechanical actuating system has a first spring-loaded actuating means for actuation of the switch and a second spring-loaded actuating means for actuation of the optical status display. Here, the first actuating means is located in the lower part of the device and the second actuating means is located in the overvoltage protection element, the first actuating means being controlled by the state of the second actuating means. That the mechanical actuating system is in two parts has the advantage that different overvoltage protection elements can be plugged onto the same base part of the device without adaptations being necessary on the actuating means of the base part of the device. In this way, the specific configuration of the actuating means of the overvoltage protection element can be adapted optimally to the respective arrester type which is contained in the overvoltage protection element.

The first actuating means, which is located in the base part of the device, is preferably implemented by a mechanical lever system which can be switched between two positions, by which the switch of the telecommunications contact can be actuated. The lever system can be formed especially by a rocker, an actuating plunger and at least one, preferably two springs, the rocker being movable out of a first position into a second position, by which the switch of the telecommunications contact is actuated.

As was stated above, the first actuating means is controlled by the state of the second actuating means. Control of the second actuating means takes place preferably according to the principle of a temperature switch, as is described, for example, in German Patent DE 42 41 311 C2. For this purpose, the second actuating means has at least one spring element and a solder site, the solder connection which is made at the solder site between the arrester or a component connected to the arrester and a part of the actuating means then being separated if the temperature of the arrester exceeds a certain response value. When there is a solder connection, the actuating means is held in the first position against the spring force of the spring element, while the actuating means with the solder connection separated is moved by spring force into the second position. The actuating means is thus pre-tensioned when the solder connection is not separated, so that when the solder connection is separated due to the temperature increase of the arrester, the actuating means is automatically moved into the second position by the spring force.

The actuation of the second spring-loaded actuating means with the optical status display and with the first actuating means can be advantageously implemented in that the second spring-loaded actuating means has the optical status display on its top end and on its other, bottom end, it has a blocking element. In the first position of the second actuating means, the actuating plunger of the first actuating means is held in the first position by the blocking element against the force of the spring, while the actuating element releases the actuating plunger in the second position, so that it likewise travels into the second position by the force of the spring.

As has already been stated, there are various possibilities for how the second spring-loaded actuating means is specifically made, the specific embodiment especially being associated with which arrester type is provided in the overvoltage protection element. According to a first embodiment the second actuating means is formed by a bent, flexible circuit board, the solder connection which is made at the solder site being implemented between the arrester and an area of the flexible circuit board. The use of a bent flexible circuit board as a spring-loaded actuating means is especially advantageously in spark gap-based arresters.

According to a second configuration, the second actuating means has a spring-loaded plastic element which is movably positioned in the housing of the overvoltage protection element and a fixed metallic retention element, an opening being formed in the plastic element through which one end of the retention element is connected to the solder site in the first position of the actuating means. When the solder connection is not separated, between one end of the metallic retention element and the arrester, the spring-loaded plastic element is then held in the first position against the spring force of the spring element, while when the solder connection is separated, the retention element releases the movably arranged plastic element so that the plastic element is moved into the second position due to the spring force of the spring element.

In another alternative embodiment of the second actuating means, there are, likewise, a spring-loaded plastic element which is movably positioned in the housing of the overvoltage protection element, and a metallic retention element. The solder connection is likewise implemented between the arrester and the metallic retention element. When the solder connection is present, the spring-loaded plastic element is held in the first position against the spring force of the spring element, and when the solder connection is separated, the plastic element is moved into the second position due to the spring force. In this version, the metallic retention element is only attached by the solder connection, so that the retention element changes its position together with the plastic element when the solder connection is separated. The metallic retention element is fixed to the spring-loaded plastic element, and this connection can be made both positive and non-positive.

According to another embodiment of the overvoltage protection device of the invention which is independent of the execution of the second actuating means, the base part of the device has at least one coding element and the overvoltage protection element has at least one corresponding opposing coding element, the coding element or elements and the opposing coding element or elements being arranged in the same manner as the plug contacts of the base part of the device and the connector contacts of the overvoltage protection element as well as the contact element and the mating contact element, each symmetrically to the transverse axis of the overvoltage protection device, so that the base part of the device and the overvoltage protection element can be brought into contact with one another in two arrangements which are turned 180° relative to one another. The execution of the coding element and the opposing coding element is especially advantageous when several overvoltage protection elements can be inserted at the same time into the base part of the device; thus, the overvoltage protection device is a multipin overvoltage protection device. The arrangement of the coding element and of the opposing coding element can then prevent an overvoltage protection element from being incorrectly plugged into the wrong position on the base part of the device.

Because the base part of the device has a symmetrical connection pattern, the base part of the device can thus be mounted such that connection of the incoming power supply lines to the corresponding terminals is easily possible, and the overvoltage protection element can always be correctly mounted regardless of the alignment of the base part of the device.

In particular, there are a host of possibilities for embodying and developing the overvoltage protection device according to the invention. Reference is made to the following detailed description of preferred embodiments of the invention in conjunction with the accompanying drawings.

DETAILED DESCRIPTION OF THE INVENTION

Figure 1:
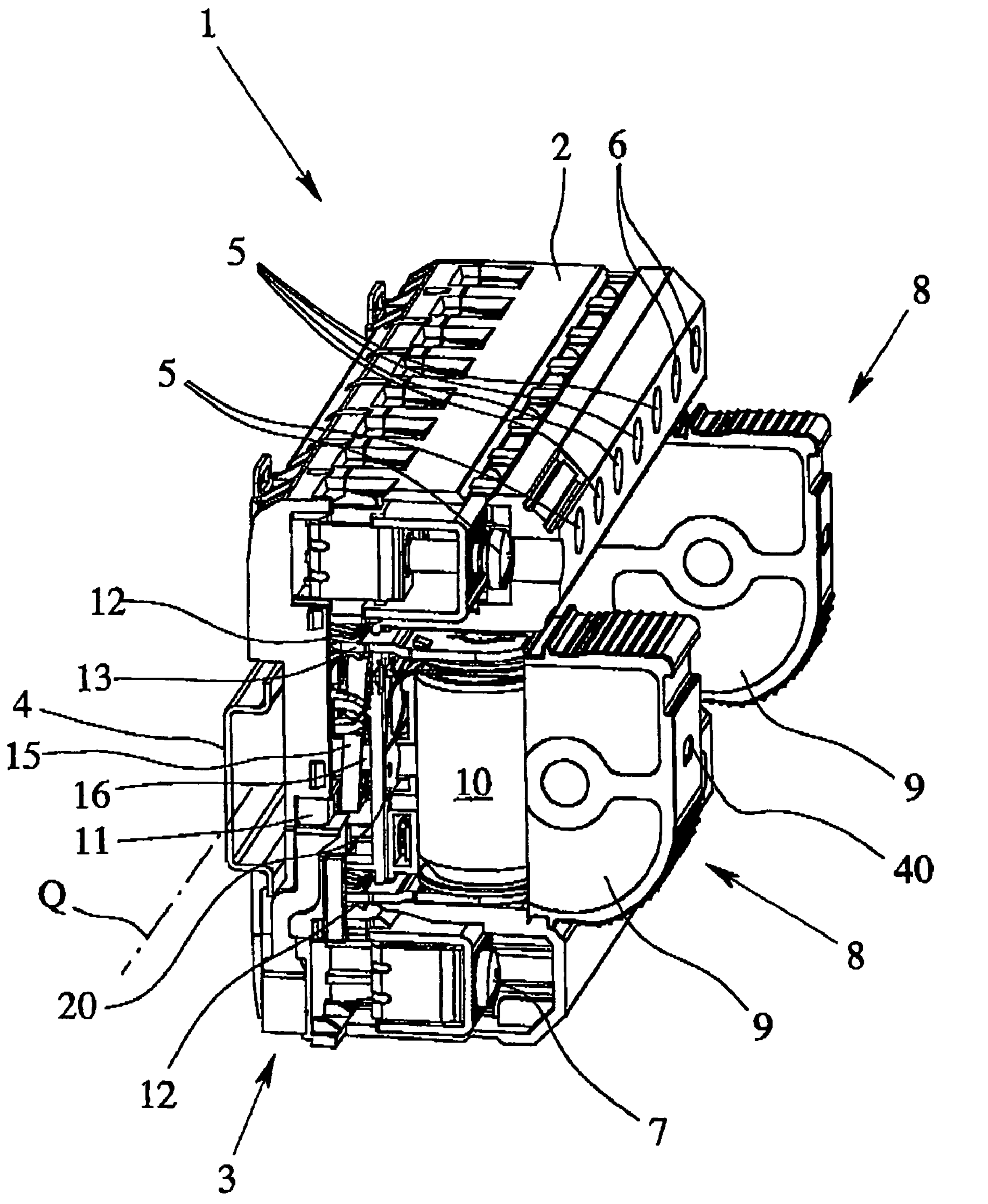
FIG. 1 is a perspective view of a multipin overvoltage protection device with two overvoltage protection elements.

The figures show an overvoltage protection device 1, with a base part 3 which has a housing 2. In the illustrated embodiments, the base part 3 of the device is essentially U-shaped, and it can be mounted with its bottom on a supporting rail 4. The base part 3 of the device in FIG. 1 on the upper U leg has two terminals 5 for each of the phase conductors and two terminals 6 for the ground conductor. In the bottom U leg of the base part 3 of the device, there are two terminals 7 for the neutral conductor.

In the embodiment of the overvoltage protection device 1 of the invention which is shown in the figures, the terminals 5, 6, 7 are each made as screw terminals. However, in addition, the terminals 5, 6, 7 can be made equally well as tension spring terminals, direct or leg spring terminals or as insulation piercing connecting devices or quick-connect terminals.

The arrangement of the terminals 5 for the phase conductors and the terminals 6 for the ground conductor on one U leg of the base part 3 of the device and the terminals 7 for the neutral conductor on the other U leg results in the base part 3 of the device having an asymmetrical connection pattern.

The overvoltage protection device 1 includes in addition to the base part 3 of the device at least one overvoltage protection element 8 which has an arrester 10 which is located in the housing 9, especially a lightning arrester which has a spark gap, or a varistor-based surge arrester. In FIG. 1, the lower half of the housing 9 of the overvoltage protection element 8 is omitted, so that the arrester 10 which is located in the overvoltage protection element 8 becomes visible.

The sensing element for defect reporting in the overvoltage protection device 1 on the base part 3 of the device 3 is a common switch 11 which can be actuated by the first spring-loaded actuating means which is explained in further detail below. The signal of the switch 11 can be relayed via an electrical line, for example, a bus line, or by radio, to an monitoring station.

The overvoltage protection elements 8 are made as protective plugs so that they can be easily mounted by plugging them onto the base part 3 of the device. To do this, in the base part 3 of the device, there are two plug contacts 12 which are made as sockets and on the bottom of the overvoltage protection element 8 there are two corresponding connector contacts 13 made as plug pins. The general plug-in capacity of the individual overvoltage protection elements 8 in addition to easy installation of the overvoltage protection elements 8 also enables simple replacement of a defective overvoltage protection element 8. For this reason, the corresponding overvoltage protection element 8 can be easily detached from the base part 3 of the device without the need for direct intervention into the installation. The rotation capacity of the base part 3 of the device relative to the overvoltage protection elements 8 is achieved in that the plug contacts 12 of the base part 3 of the device and the connector contacts 13 of the overvoltage protection element 8 are arranged symmetrically to the transverse axis Q of the overvoltage protection device 1.

To display the status or the state of the overvoltage protection element 8 and of the arrester 10, the overvoltage protection element on its upper narrow side, i.e., the one facing away from the base part 3 of the device, has a status display 14. The status display 14 shown in FIGS. 4 to 6 is actuated together with the switch 11 of the telecommunications contact via a common mechanical actuating system which comprises a first spring-loaded actuating means and a second spring actuating means.

Figure 2:
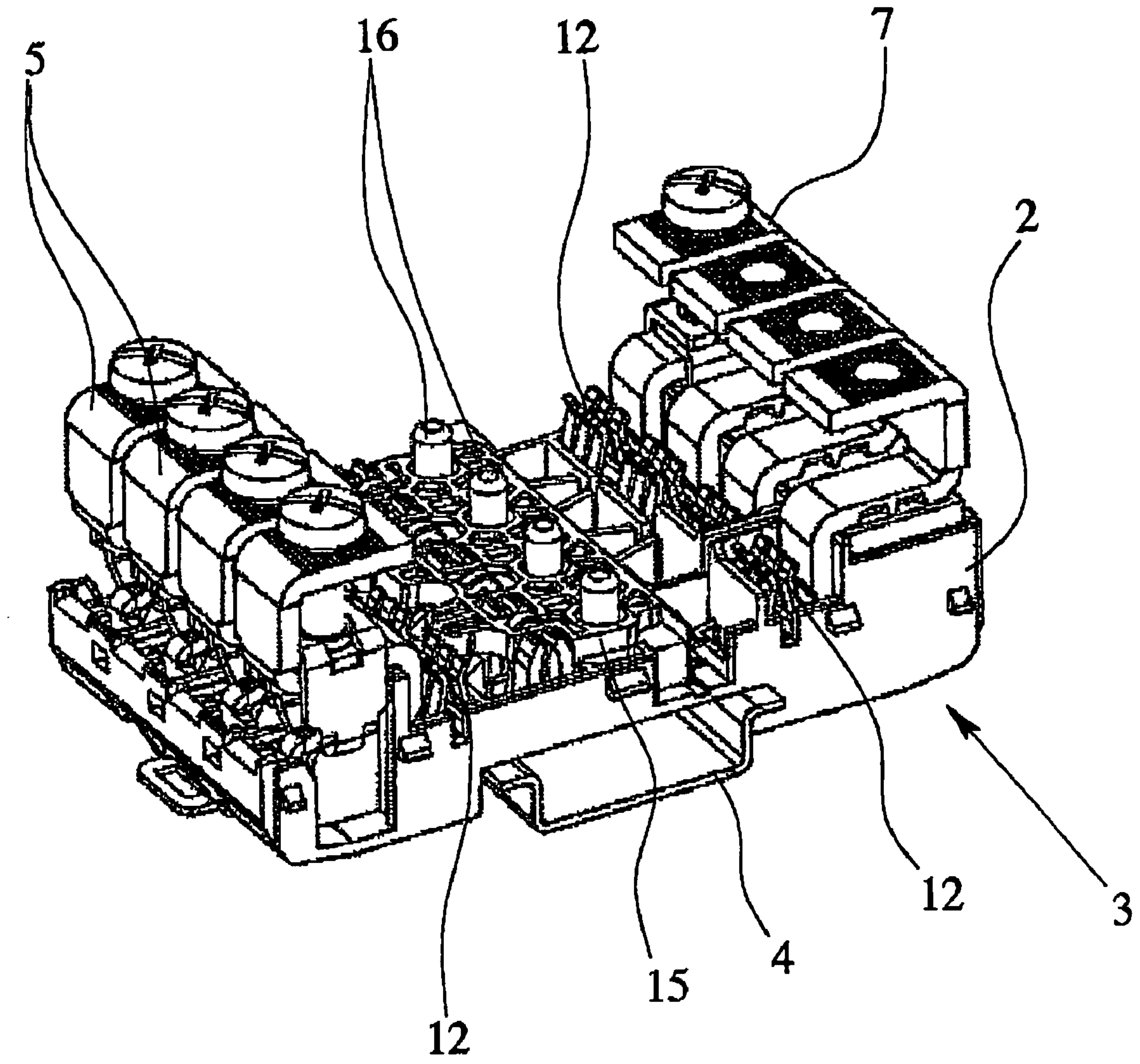
FIG. 2 is a perspective view of the base part of a multipin overvoltage protection device.
Figure 3A:
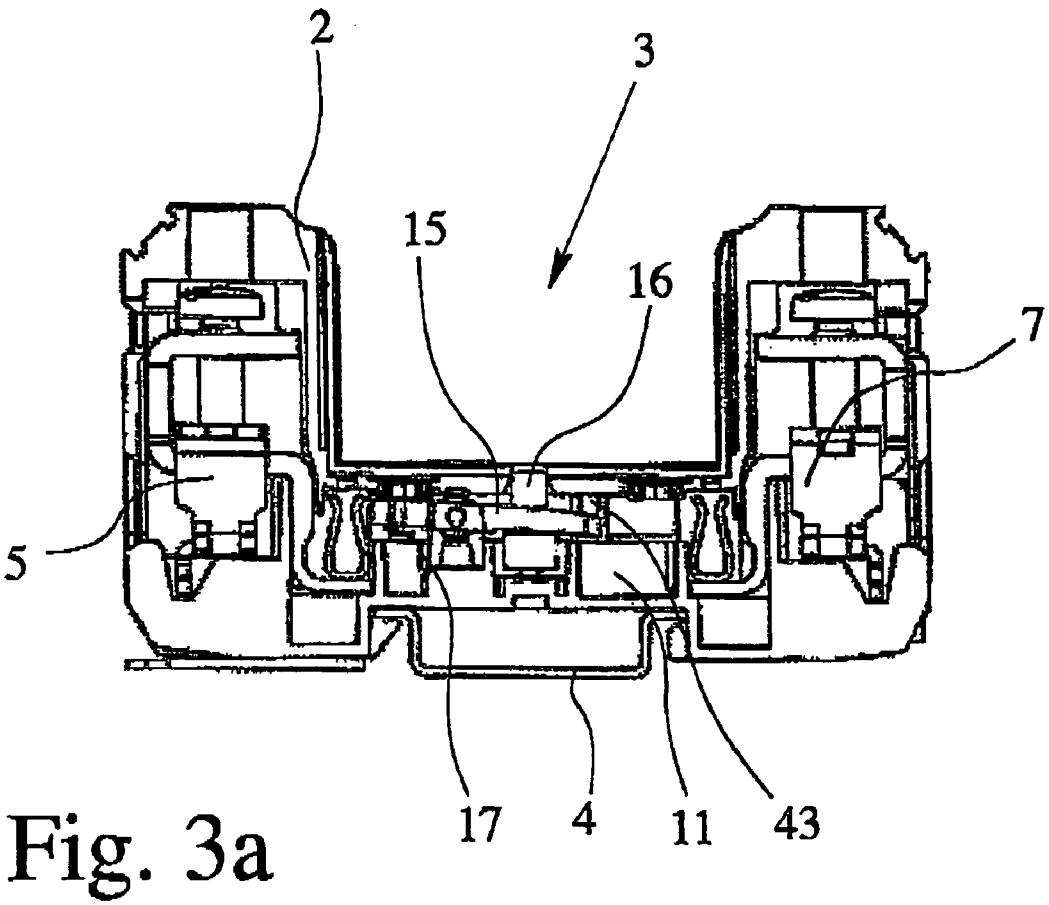
FIG. 3 shows two representations of the base part of the device, each in a lengthwise section, with a first actuating means in two different positions.
Figure 3B:
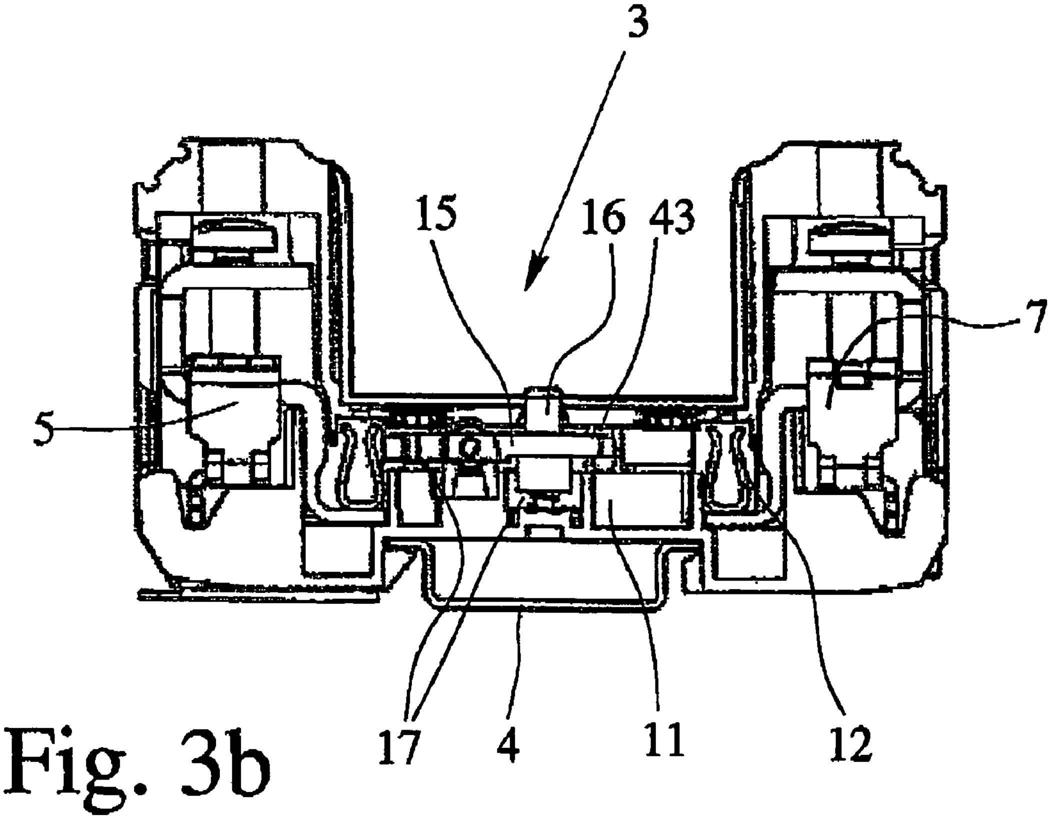

A preferred structure of a first actuating means which is located in the housing 2 of the base part 3 of the device will be explained below using FIGS. 2 & 3. The first actuating means is formed by a lever system and includes a rocker 15, an actuating plunger 16 and two springs 17. In the first position of the first actuating means shown in FIG. 3*a*, the rocker 15 is deflected such that one end makes contact with the switch 11. Here, the actuating plunger 16 is pressed down by the second actuating means, as will be explained below, against the spring force of the spring 17 which is assigned to the actuating plunger 16. In the second position, which is shown in FIG. 3*b*, the rocker 15 is in an essentially horizontal position in which the end of the rocker 15 no longer makes contact with the switch 11.

FIGS. 4*a* to 6*b* show three different overvoltage protection elements 8 which each have a different arrester type and a different second actuating means. It is common to the three differently made actuating means that they each have a spring element 18, a solder site 19 and a locking element 20.

Figures 4A, 4B:
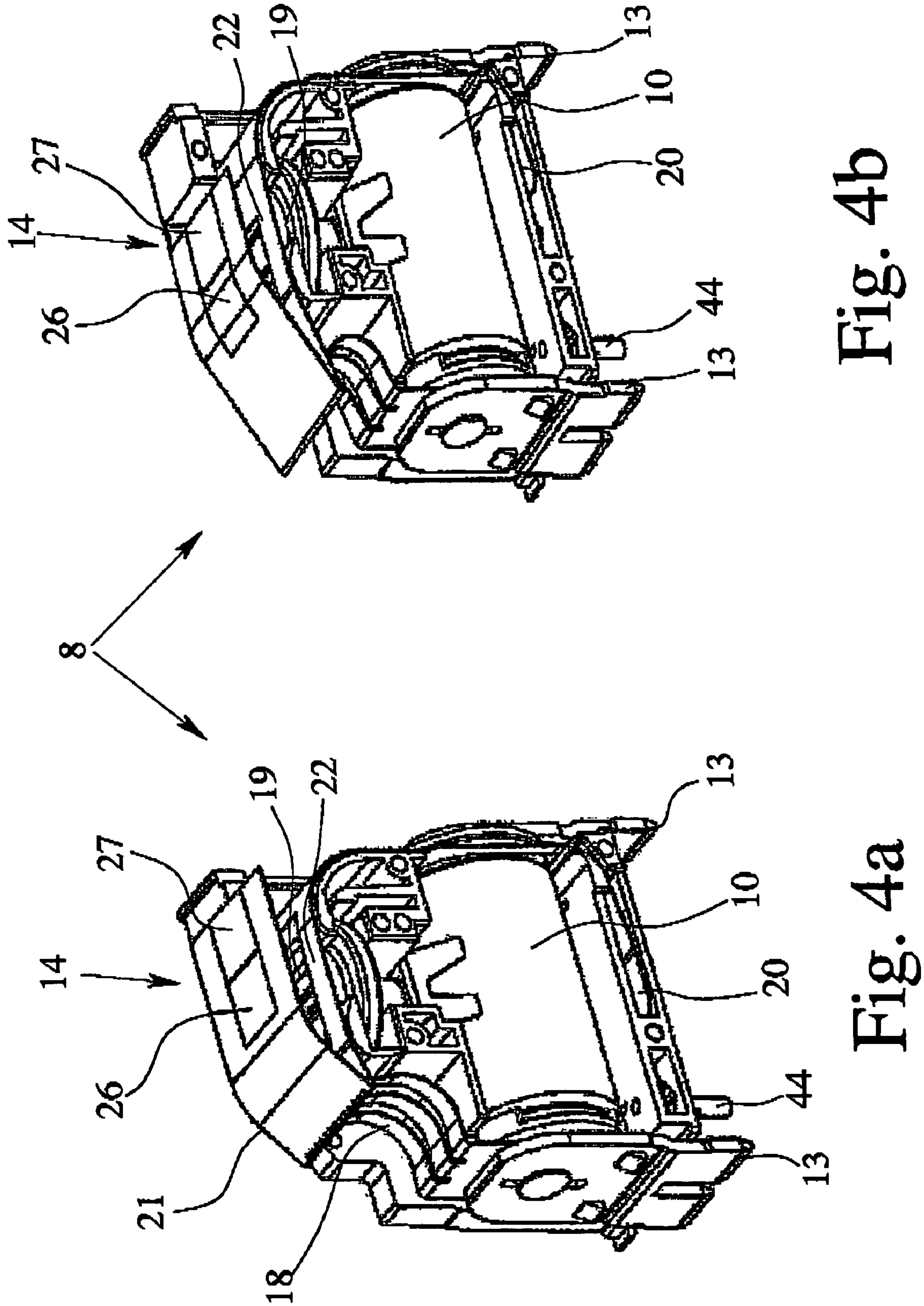
FIG. 4 shows two representations of a first embodiment of an overvoltage protection device, with a second actuating means in two different positions.

In the embodiment shown in FIGS. 4*a* & 4*b*, the second actuating means is formed by a bent flexible circuit board 21, which is bent on one side around the arrester 10, has the status display 14 on its top end and the blocking element 20 on its bottom end. The flexible circuit board 21 has an area 22 which, on the solder site 19, forms the solder connection to the arrester 10 which is made as a spark gap. As FIGS. 4*a*, 4*b* show, the solder site 19 need not be made directly on the arrester 10, so that the solder connection is not directly between the area 22 of the flexible circuit board 21 and the arrester 10. For operation of the second actuating means, it is simply necessary that, when the temperature of the arrester 10 rises above a given response value, the solder connection is separated. In the illustrated embodiment, the solder site 19 and the solder connection are made between the area 22 and the ignition circuit of the arrester 10.

In the first position of the second actuating means shown in FIG. 4*a*, the solder connection is not separated, so that the flexible circuit board 21 is deflected against the spring force of the spring element 18 as a result of the solder connection at the solder site 19. In the second position of the second actuating means, which is shown in FIG. 4*b*, conversely, the solder connection is separated, so that the flexible circuit board 21 can be pulled into the second position by the spring force of the spring element 18.

Figure 5B:
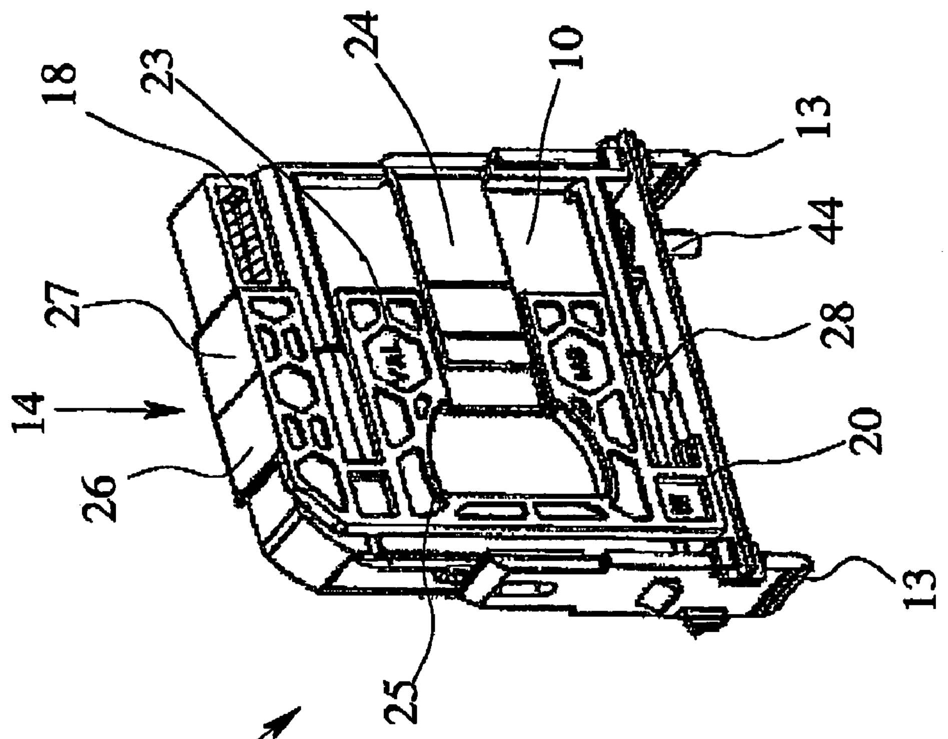
FIG. 5 shows two representations of a second embodiment of an overvoltage protection device, with a second actuating means in two different positions.
Figure 5A:
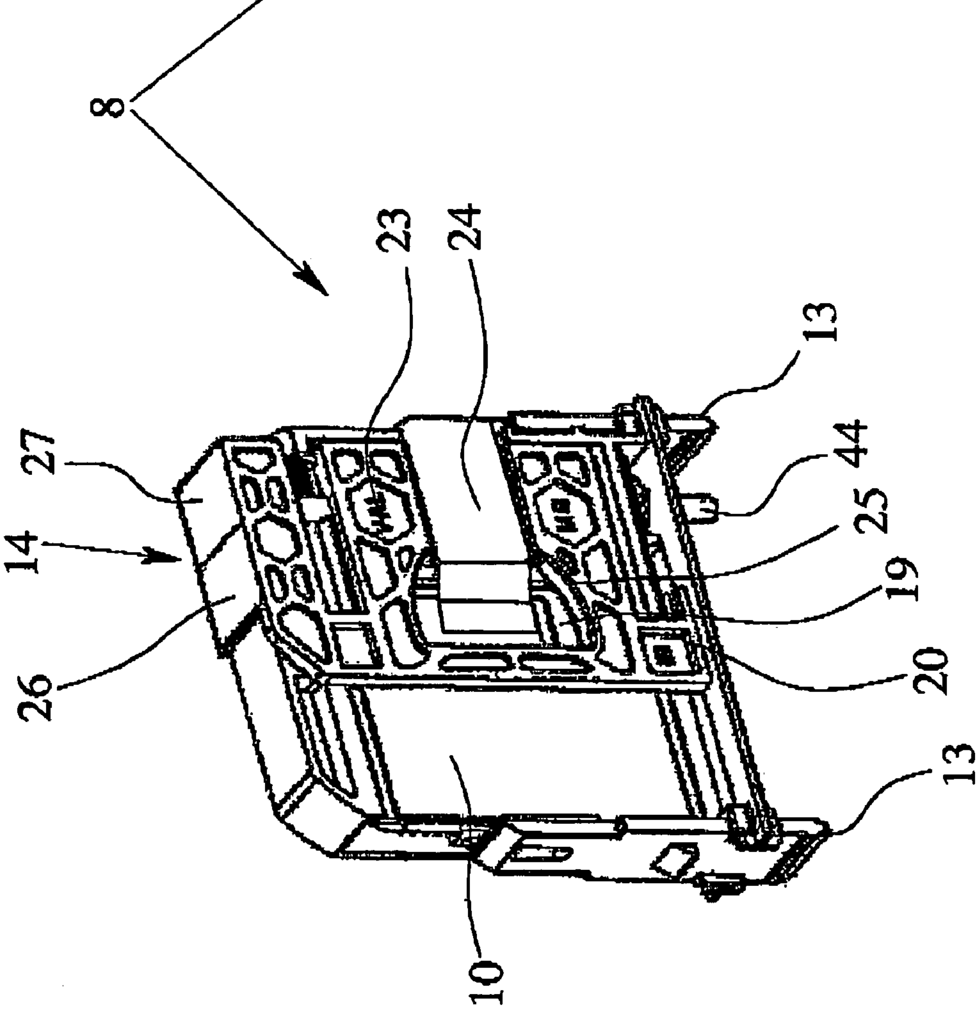
Figure 6:
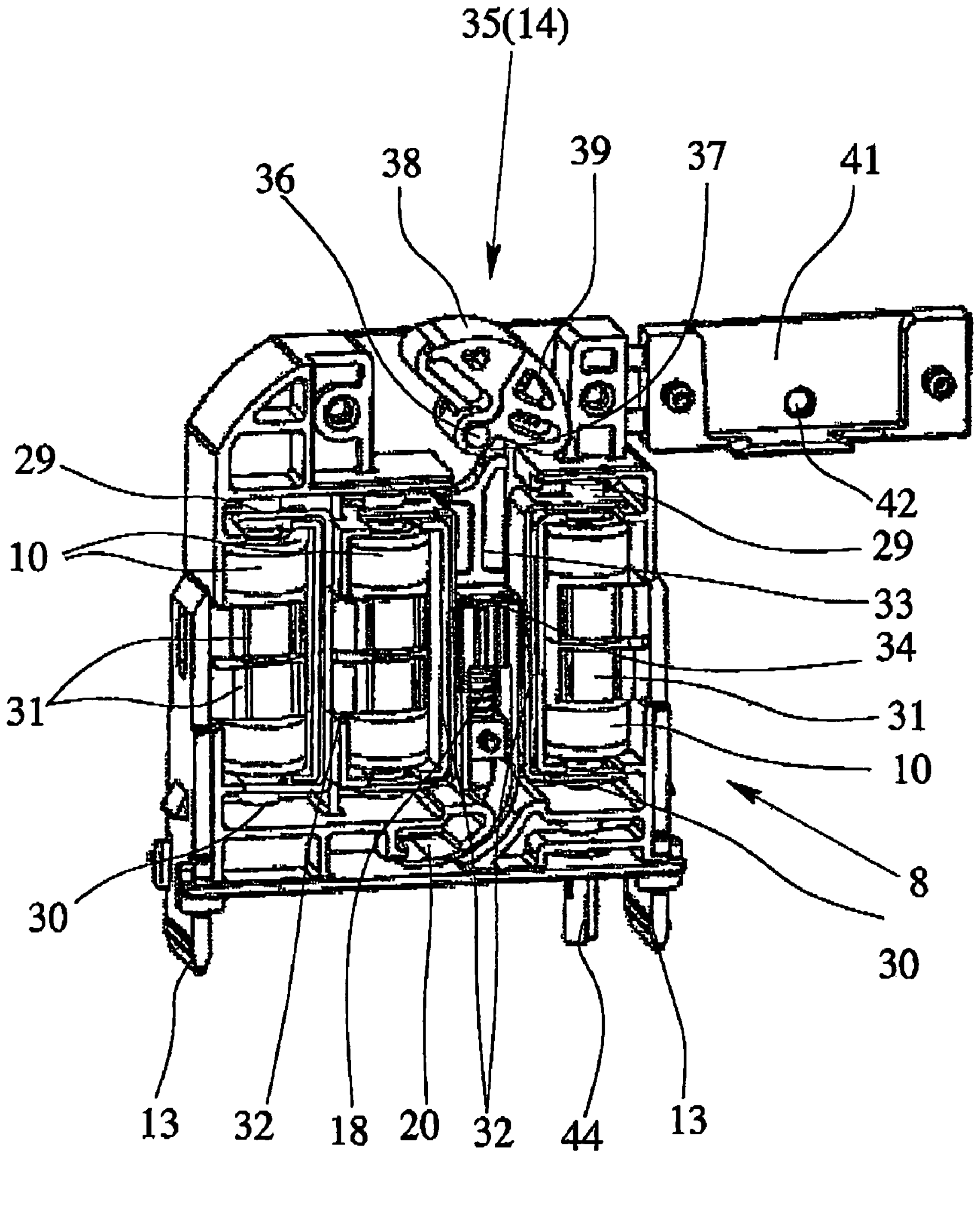
FIG. 6 shows a representation of a third embodiment of an overvoltage protection device and FIG. 7 shows a perspective of a multipin overvoltage protection device with an overvoltage protection device as shown in FIG. 6.

In the second embodiment of overvoltage protection element 8, which is shown in FIGS. 5*a* & 5*b*, in which a varistor is used as the arrester 10, the actuating means has a plastic element 23 which is movably positioned in the housing 9 of the overvoltage protection element 8, and a fixed metallic retention element 24. The plastic element 23 is held in the first position of the actuating means by the solder connection which exists at the solder site 19, between the metallic retention element 24 and the varistor, against the spring force of the spring element 18 which is made as a compression spring. For this reason, in the plastic element 23, there is an opening 25 through which one end of the retention element 24 is connected to the solder site 19 in the first position of the actuating means. When the temperature of the varistor exceeds a given response value, the solder connection which is formed at the solder site 19 is separated, so that the plastic element 23 is pushed into the second position by the spring force of the spring element 18 (FIG. 5*b*). In this second position, the metallic retention element 24 is thermally and electrically separated from the varistor by the plastic element 23.

Common to the two embodiments shown in FIGS. 4 & 5 is the fact that the top end of the flexible circuit board 21 or of the plastic element 23 is made as an optical status display 14, for which two marks 26, 27 in different colors are printed or cemented on the flexible circuit board 21 or the plastic element 23 next to one another. The first mark 26 is green and the second mark 27 is red. The first green mark 26 is visible through the respective viewing window 40 (FIG. 1) in the first position, the "non-defective" position, while the second red mark 27 is visible through viewing window 40 in the second position, the "defective" position.

Moreover, as stated above, a blocking element 20 is formed on the lower end of the flexible circuit board 21 or of the plastic element 23. The blocking element 20 is made and arranged such that, in the first position of the actuating means, it closes the opening 28 made on the bottom of the overvoltage protection element 8, while in the second position of the actuating means, it clears the opening 28. Because the opening 28 matches the position of the actuating plunger 16 in the base part 3 of the device when the overvoltage protection element 8 has been plugged in, thus, because the blocking element 28 in the first position of the second actuating means closes the opening 20, the actuating plunger 16 is pressed down against the spring force of the spring 17. Conversely, in the second position of the second actuating means, the opening 28 is no longer closed by the blocking element 20, so that the actuating plunger 16 can be moved up through the opening 28 due to the spring force of the spring 17. Depending on the position of the blocking element 20, and thus, on the position of the second actuating means, therefore the position of the actuating plunger and thus the first actuating means located in the base part 3 of the device are actuated.

Figure 7:
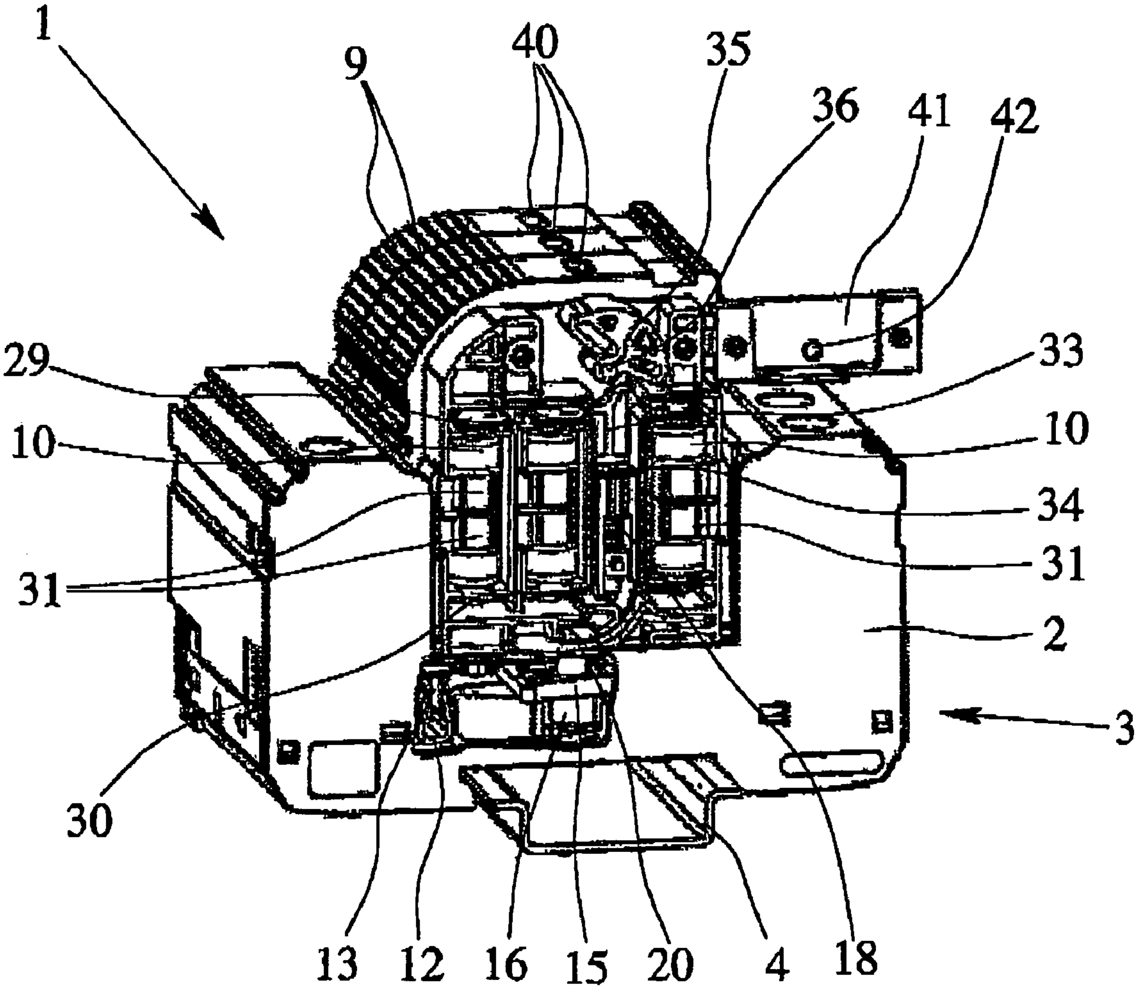

The overvoltage protection element 8 which is shown in FIGS. 6 & 7 differs, first of all, from the above described overvoltage protection element 8 in that, in the overvoltage protection element 8 shown here, there are three arresters 10 which are made as spark gaps in an insulating housing which is provided in addition in the housing 9. The overvoltage protection element 8 which is shown in FIG. 6 thus constitutes a plug-in, cumulative spark gap. The cylindrical arresters 10 each have pin-shaped connecting contacts 29, 30 on their ends with which they are locked into the corresponding recesses in the housing 9. The individual arresters 10 make contact on their jacket surface with spring clips 31, the electrical connection between the individual arresters 10 being produced by essentially U-shaped electrical connecting pieces 32 which are plugged onto the connecting contacts 29, 30 and are connected to the spring clips 31.

In the overvoltage protection element 8 which is shown in FIGS. 6 & 7, the second actuating means is implemented by a spring-loaded plastic element 33 which is located movably in the housing 9 and by a metallic retention element 34, the plastic element 33 being located between two arresters 10, essentially parallel to the lengthwise extension of the arresters 10. In the first position of the actuating means shown in FIG. 6, the metallic retention element 34 is connected by a solder connection to two connecting pieces 32 of two arresters 10. For this reason, the retention element 34 is made U-shaped, the two U-legs each forming a solder site 19 with a respective connecting piece 32. When the solder connection is present, the plastic element 33 is held in the first position shown in FIG. 6 against the spring force of a spring element 18 which is made as a compression spring. For this reason, the plastic element 33 has a projection which adjoins the U-back of the retention element 34. If the solder connection between the metallic retention element 34 and the two connecting pieces 32 is opened due to the temperature rise of the arresters 10, the plastic element 33 moves up due to the spring force of the compression spring 18, together with the retention element 34.

The optical status display 14 in the embodiment shown in FIGS. 6 & 7 is formed by a rocker arm or pivoting element 35 which is pivotally supported in the housing 9 and which is connected to the plastic element 33 via a flexible crosspiece 37 which acts outside of the pivot pin 36 which forms the axis of rotation for element 35. By this type of connection of the plastic element 33 to the hemispherical pivoting element 35, a rotary or pivoting motion of the pivoting element results from the translational motion of the plastic element 33, so that the pivoting element 35 is moved out of the first position into the second position.

According to the embodiment shown in FIGS. 6 & 7, the pivoting element 35 also has two differently colored sections 38, 39, and depending on the position of the second actuating means only one or the other colored section 38, 39 is detectable from the outside through the respective viewing window 40 (FIG. 7) which is located in the housing 9 of the overvoltage protection element 8. The first, green section 38 is visible in the first position, the "non-defective" position, through the viewing window 40, while the second, the red section 39 is visible in the second position, the "defective" position.

To hold and support the pivoting element 35, on the insulating housing of the arresters 10, there is a hinged cover 41 in which a bearing eye 42 is made for the pivot pin 36 of rotation of the pivoting element 35. As has already been explained in conjunction with FIGS. 4 & 5, the lower end of the plastic element 33 which faces the base part 3 of the device also has a blocking element 20 by which the opening 28 can be covered depending on the position of the plastic element 33. In conjunction with FIG. 7, it is recognizable that the overvoltage protection element 8 within the housing 9 (which is shown only partially in FIGS. 1 & 7) has an insulating housing which holds or surrounds the arresters 10.

As was stated at the beginning, the overvoltage protection device 1 in accordance with the invention is used preferably as a multipin overvoltage protection device, i.e., several overvoltage protection elements 8 are inserted next to one another into the base part 3 of the device. Depending on the number of lines of the low voltage network which is to be protected (3-conductor, 4-conductor or 5-conductor network) and depending on whether a lightning arrester is necessary, the corresponding number and type of overvoltage protection elements 8 is inserted into the correspondingly dimensioned base part 3 of the device. In order to prevent the overvoltage protection element 8 from being plugged into the wrong position within the base part 3 of the device, there are coding elements 43 on the base part 3 of the device, and there are the corresponding opposing coding elements 44 on the bottom of the overvoltage protection element 8. To ensure a rearrangement capacity, the coding elements 43 and the opposing coding elements 44 are each arranged symmetrically relative to the transverse axis Q (FIG. 1) of the overvoltage protection device 1.

What is claimed is:

1. Overvoltage protection device for protection of low voltage electrical installations, comprising:

a device base part with terminals for phase conductors and ground or neutral conductors, and at least one overvoltage protection element with at least one arrester which is located in a housing, wherein the base part has at least one telecommunications contact which has a switch for remote indication of the state of the at least one overvoltage protection element, wherein the base part of the device has plug-in contacts which are connected to the terminals, and wherein the overvoltage protection element has corresponding connector contacts, so that the overvoltage protection element can be plugged onto the base part of the device, wherein the overvoltage protection element has an optical status display, wherein a mechanical actuating system is provided for actuating of both the optical status display and the switch of the telecommunications contact, wherein the mechanical actuating system has a first spring-loaded actuating means for actuation of the switch and a second spring-loaded actuating means for actuation of the optical status display, the first actuating means being located in the base part of the device and the second actuating means being located in the overvoltage protection element, wherein the first actuating means is actuated by the second actuating means, and wherein the first actuating means has a rocker, an actuating plunger and at least one spring, the rocker being movable out of a first position into a second position, by which the switch of the telecommunications contact is actuated; and wherein the rocker, the actuating plunger and the at least one spring being located in said device base part.

2. Overvoltage protection device as claimed in claim 1, wherein the second spring-loaded actuating means has at least one spring element and a solder site, a solder connection being provided at the solder site between the arrester and a part of the actuating means, the solder connection being adapted to separate when the temperature of the arrester exceeds a certain response value, the actuating means being held in the first position against the spring force of the spring element by the solder connection, and being moved by spring force into the second position when the solder connection separates.

3. Overvoltage protection device as claimed in claim 2, wherein the optical status display is located on a top end of the second spring-loaded actuating means and wherein the opposite, bottom end has a blocking element, in the first position of the second actuating means the actuating plunger of the first actuating means being held in the first position by the blocking element against the force of a second spring element and in the second position of the second actuating means the blocking element releasing the actuating plunger, so that it is moved into the second position by the force of the second spring element.

4. Overvoltage protection device as claimed in claim 3, wherein the second, spring-loaded actuating means comprises a bent, flexible circuit board, the solder connection at the solder site being implemented between the arrester and an area of the flexible circuit board.

5. Overvoltage protection device as claimed in claim 3, wherein the second spring-loaded actuating means has another spring-loaded plastic element which is located movably in the housing of the overvoltage protection element and a fixed metallic retention element, an opening being provided in the plastic element through which one end of the retention element is connected to the solder site in the first position of the actuating means.

6. Overvoltage protection device as claimed in claim 4, wherein the optical status display comprises two marks of different colors which are located next to one another.

7. Overvoltage protection device as claimed in claim 3, wherein the second spring-loaded actuating means has an additional spring-loaded plastic element which is located movably in the housing of the overvoltage protection element and a fixed metallic retention element, the solder connection at the solder site being implemented between at least one arrester and the metallic retention element, and the plastic element being held in a first position against the spring force of the additional spring element when the solder connection is present, and being moved into a second position by the spring force when the solder connection separates.

8. Overvoltage protection device as claimed in claim 7, wherein the optical status display comprises a pivoting element which is pivotally supported in the housing and which is connected to the plastic element via a crosspiece which acts on the pivoting element outside of an axis of rotation of the pivoting element.

9. Overvoltage protection device as claimed in claim 8, wherein the pivoting element is hemispherical and has two differently colored sections.

10. Overvoltage protection device as claimed in claim 9, wherein said optical status display comprises a viewing window provided in the housing and two differently colored marks or sections, the viewing window being dimensioned such that, depending on the position of the second actuating means, only one or the other colored mark or section is externally detectable through the viewing window.

11. Overvoltage protection device as claimed in claim 1, wherein in the overvoltage protection element (8) there are several, preferably three arresters (10) which are made as spark gaps.

12. Overvoltage protection device as claimed in claim 11, wherein each of the arresters is cylindrical with connecting contacts on opposite ends by which the arresters are mechanically attachable in the overvoltage protection element.

13. Overvoltage protection device as claimed in claim 12, wherein the arresters are electrically connected to one another by spring clips and connecting pieces which are connected to them, the connecting pieces being plugged onto the connecting contacts.

14. Overvoltage protection device as claimed in claim 1, wherein the device base part has at least one coding element and the overvoltage protection element has at least one corresponding opposing coding element.

15. Overvoltage protection device as claimed in claim 1, wherein the device base part has a symmetrical housing shape, and is adapted for being locked on a supporting rail.

16. Overvoltage protection device as claimed in claim 6, wherein said optical status display comprises a viewing window provided in the housing and two differently colored marks or sections, the viewing window being dimensioned such that, depending on the position of the second actuating means, only one or the other colored mark or section is externally detectable through the viewing window.

* * * * *